(12) United States Patent
Kitahara

(10) Patent No.: US 11,662,655 B2
(45) Date of Patent: May 30, 2023

(54) ROD LENS ARRAY, AND LIGHTING OPTICAL SYSTEM AND DEVICE INCLUDING SAME

(71) Applicant: NICHIA CORPORATION, Anan (JP)

(72) Inventor: Wataru Kitahara, Kamiina-gun (JP)

(73) Assignee: NICHIA CORPORATION, Anan (JP)

( * ) Notice: Subject to any disclaimer, the term of this patent is extended or adjusted under 35 U.S.C. 154(b) by 334 days.

(21) Appl. No.: 17/032,908

(22) Filed: Sep. 25, 2020

(65) Prior Publication Data

US 2021/0096450 A1    Apr. 1, 2021

(30) Foreign Application Priority Data

Sep. 27, 2019  (JP) .............................. JP2019-176485

(51) Int. Cl.
    G03B 21/20    (2006.01)
    F21V 8/00     (2006.01)
    G02B 3/00     (2006.01)

(52) U.S. Cl.
    CPC ......... *G03B 21/208* (2013.01); *G02B 3/0037* (2013.01); *G02B 6/0008* (2013.01); *G03B 21/2013* (2013.01)

(58) Field of Classification Search
    CPC .............. G03B 21/208; G03B 21/2013; G02B 3/0037; G02B 6/0008
    See application file for complete search history.

(56) References Cited

U.S. PATENT DOCUMENTS

2019/0293261 A1* 9/2019 Jiang ...................... F21V 5/008

FOREIGN PATENT DOCUMENTS

| JP | 11-23805 A    | 1/1999  |
| JP | 2003-330109 A | 11/2003 |
| JP | 2004-198536 A | 7/2004  |
| JP | 2007-288169 A | 11/2007 |
| JP | 2009-058594 A | 3/2009  |
| JP | 2012-500411 A | 1/2012  |
| JP | 2017-022035 A | 1/2017  |
| JP | 2017-111341 A | 6/2017  |
| JP | 2019-056914 A | 4/2019  |

\* cited by examiner

*Primary Examiner* — Anne M Hines
(74) *Attorney, Agent, or Firm* — Birch, Stewart, Kolasch & Birch, LLP

(57) ABSTRACT

Provided is a rod lens array including a plurality of two-dimensionally arranged rod lenses. The rod lens array can be provided in a state of being easily mounted in lighting devices for HUD, and the like. The rod lens array includes: a rod lens portion in which a plurality of rod lens elements including a first light guide member is two-dimensionally arranged; an emission portion in which a plurality of curved elements including the first light guide member is two-dimensionally arranged so as to correspond, respectively, to a plurality of rod lens elements on an emission side; and a connection portion in which a connection element including the first light guide member two-dimensionally extends so as to integrally connect the plurality of curved elements to the plurality of rod lens elements.

15 Claims, 8 Drawing Sheets

ROD LENS ARRAY, AND LIGHTING OPTICAL SYSTEM AND DEVICE INCLUDING SAME

CROSS-REFERENCE TO RELATED APPLICATION

This application claims priority to Japanese Patent Application No. 2019-176485, filed on Sep. 27, 2019, the contents of which are hereby incorporated by reference in their entirety

BACKGROUND

1. Technical Field

The present disclosure relates to a rod lens array, and a lighting optical system and device including the rod lens array.

2. Description of Related Art

Japanese Translation of PCT International Application Publication No. JP-T-2012-500411 discloses an image forming light source module including a plurality of light guides, a plurality of light emitting sources, and an intermediate image plane. Each of a plurality of light guides has an inlet surface, an outlet surface and at least one lateral wall, and all the light guides enable supply of light along a corresponding orientation axis crossing a common reference point. Each of a plurality of light emitting sources supplies light only a single light guide among a plurality of light guides. The intermediate image plane includes a plurality of pixels, and each pixel receives light from the outlet surface of a corresponding single light guide among a plurality of light guides.

SUMMARY

A plurality of light guides configured to guide light from a plurality of light emitting sources is required to be provided in a state of being easily mounted in, for example, a lighting device for a head-up display (hereinafter, referred to as "HUD").

The present disclosure relates to a rod lens array enabling light guides to be provided in a state of being easily mounted in a lighting device or the like.

One aspect disclosed herewith is a rod lens array including: a rod lens portion in which a plurality of rod lens elements including a first light guide member is two-dimensionally arranged; an emission portion in which a plurality of curved elements including the first light guide member is two-dimensionally arranged so as to correspond, respectively, to a plurality of rod lens elements on an emission side; and a connection portion in which a connection element including the first light guide member two-dimensionally extends so as to integrally connect a plurality of curved elements to a plurality of rod lens elements.

The present disclosure relates to a rod lens array enabling light guides to be provided in a state of being easily mounted in a lighting device or the like.

DETAILED DESCRIPTION OF EMBODIMENTS

Figure 1A:
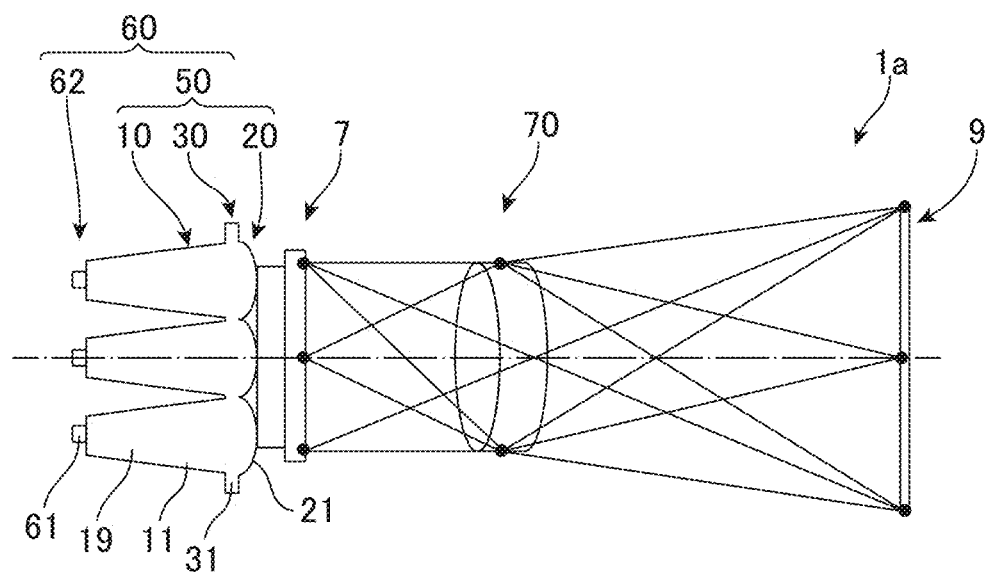
FIG. 1A is a diagram illustrating an example of a projection device including a rod lens array, and illustrating an outlined configuration of a device configured to project a real image.

Hereinafter, certain embodiments disclosed herewith will be described with reference to the drawings.

The drawings are schematic, and the relationship between a thickness and a width of a component in the drawings, ratios between sizes of portions in the drawings, and the like may not be the same as those in actual light emitting devices. Further, the same portion may be illustrated with different lengths or ratios among the drawings. In the specification of the present application, the same elements as those described earlier with reference to the drawings may be denoted by the same numerals, and detailed descriptions thereof may be omitted as appropriate.

A rod lens formed from a substantially transparent optical material formed of acrylic, polycarbonate, glass or another appropriate organic material, inorganic material, composite material or the like is an element configured to propagate light by means of total reflection from lateral surfaces, and a backlight (lighting device) including the rod lens is employed in projection devices and the like.

Figure 1B:
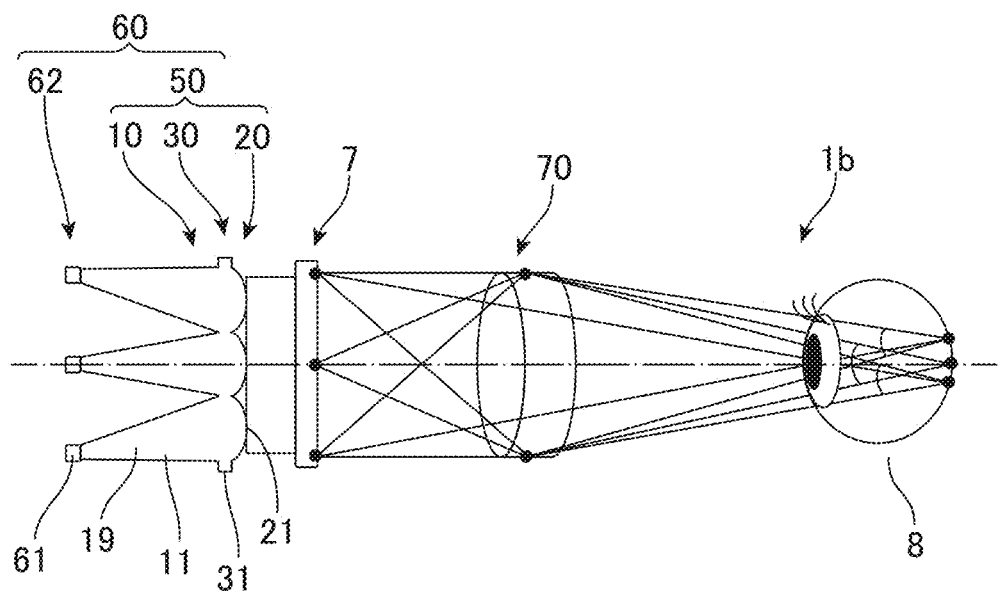
FIG. 1B is a diagram illustrating an example of a projection device including a rod lens array, also illustrating an outlined configuration of a direct-view-type device configured to observe a virtual image.

FIG. 1 illustrates a projection device including a tapered rod lens array. FIG. 1A illustrated an outlined configuration of a device configured to project a real image, and FIG. 1B illustrates an outlined configuration of a direct-view-type device configured to observe a virtual image. In the projection device, the brightness and uniformity of a projected image can be improved by uniformizing light from cells and matching the numerical aperture (NA) of a projection optical system with the NA of a lighting optical system. FIG. 1A illustrates a projection-type device 1a in which an intermediate image in an image device 7 such as a LCD illuminated with light from a lighting optical system 60 including a light source array 62 and a rod lens array 50 is projected to a screen 9 and a road surface by a projection optical system 70. Examples of the device include adaptive driving beams (ADBs). FIG. 1B illustrates a direct-view-type device 1b in which an intermediate image in the image device 7 illuminated with light from the lighting optical system 60 is directly viewed as a virtual image by an eye 8 through the projection optical system 70. Examples of the device include HUDs.

The rod lens array 50 includes a rod lens portion 10 in which a plurality of rod lens elements 11 including the substantially transparent optical material (first light guide member) 19 is two-dimensionally arranged; an emission portion 20 in which a plurality of curved elements 21 including the first light guide member 19 is two-dimensionally arranged so as to correspond, respectively, to a plurality of rod lens elements 11 on the emission side; and a connection portion 30 in which a connection element 31 including the first light guide member 19 two-dimensionally extends so as to integrally connect a plurality of curved elements 21 to a plurality of rod lens elements 11. Each of a plurality of rod lens elements 11 in the rod lens array 50 of this example has a tapered shape with a size larger on an emission side than on an incidence side. The lighting optical system 60 includes the light source array 62 in which a plurality of light source elements, e.g., LEDs 61, is two-dimensionally arranged so as to correspond, respectively, to a plurality of rod lens elements 11 on the incidence side.

Figure 2:
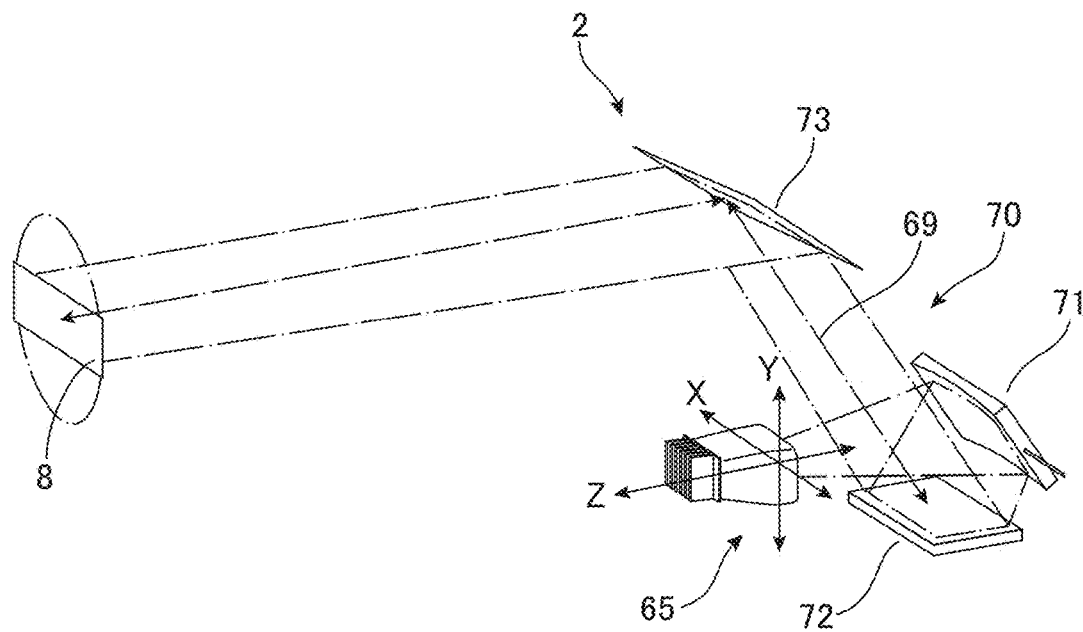
FIG. 2 is a diagram illustrating an outlined configuration of HUD.

FIG. 2 illustrates an outlined configuration of a HUD 2. Projection light 69 outputted from an image output system 65 including the lighting optical system 60 reaches the eye (eye box) 8 through the projection optical system 70 including a free-form surface mirror 71, a concave mirror 72 and a front windshield (flat surface) 73. In the HUD 2, an image generated by the image device 7 of the image output system 65 can be observed as a virtual image in a size of about several tens cm at a point several meters from the eye 8.

Figure 3:
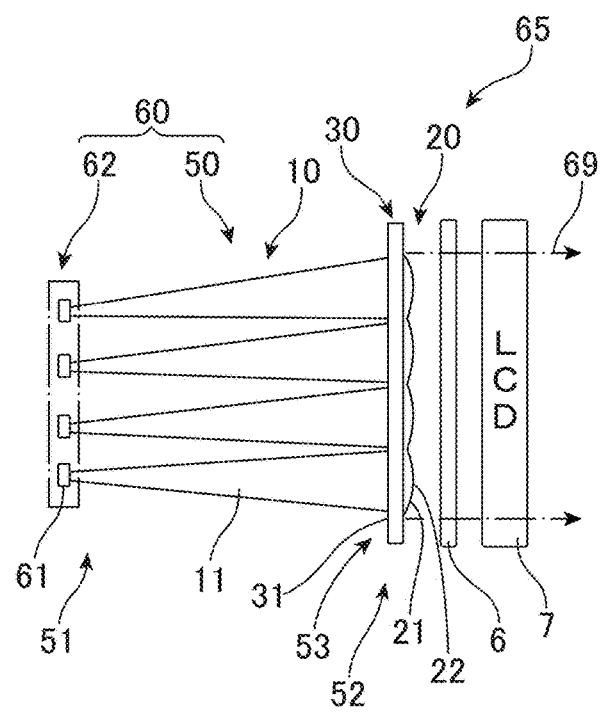
FIG. 3 is a diagram illustrating an outlined configuration of an image output system.

FIG. 3 illustrates an outlined configuration of an example of the image output system 65. The image output system 65 includes the light source array 62 serving as a light source, the rod lens array 50 formed so as to match illumination light from the light source array 62 with the NA of the projection system 70, a diffusion sheet 6, and an image device configured to modulate the illumination light, e.g., a transmissive LCD 7. The rod lens array 50 includes a plurality of rod lens elements 11 which is in contact with a LED 61 forming the light source array 62 and which has a tapered shape with a size larger on an emission side (output side) 52 than on an incidence side (input side) 51, i.e., a quadrangular pyramid or a quadrangular truncated pyramid in this example; a plurality of lens arrays 22 disposed, respectively, on a plurality of rod lens elements 11 on the output side 52 and serving as curved elements 21; and the connection element 31 two-dimensionally extending so as to connect a part of a connection portion (boundary) between the rod lens elements 11 and the curved elements 21 or its vicinity (edge portion) 53.

In addition, the rod lens array 50 is assembled in a tapered shape with a size larger on the emission side 52 than on the incidence side 51 as a whole, so that the area on the incidence side 51 on which the LED 61 is disposed can be made smaller than the area on the emission side 52. For enabling further reduction of the area on the incidence side 51, the tapered rod lens elements 11 may have different shapes. For example, among rod lens elements 11 disposed in multiple stages, rod lens elements 11 disposed at both ends in the row direction X may have a taper shape which is eccentric such that the rod lens element 11 is closer to the center in the row direction X on the incidence side 51 than on the emission side 52 with respect to rod lens elements 11 disposed at the center. The same applies to rod lens elements 11 disposed in the column direction Y.

Figure 4:
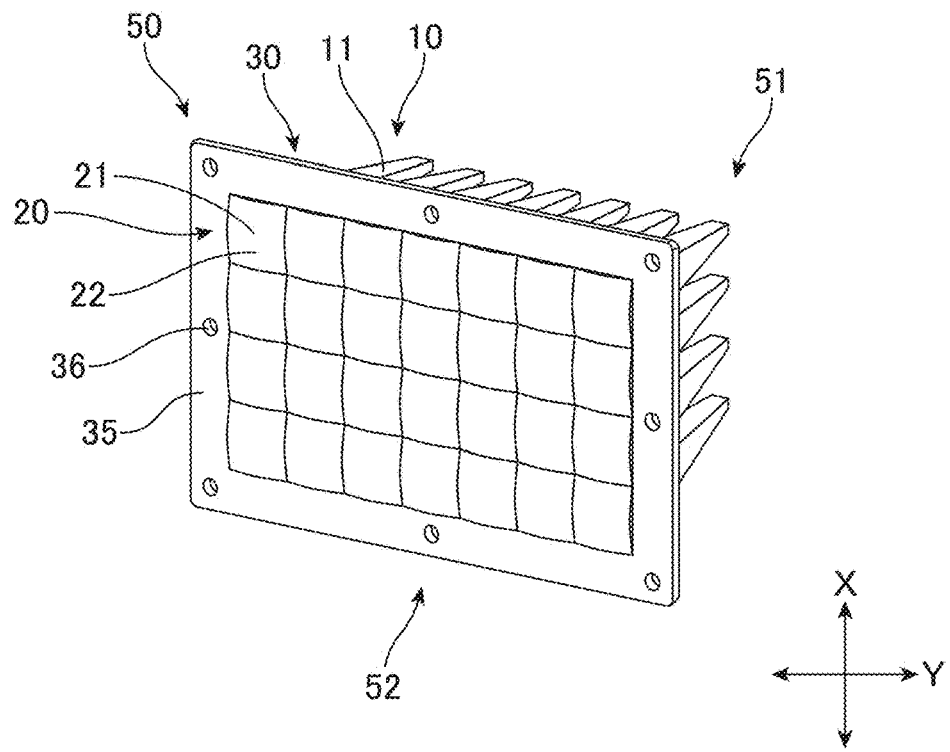
FIG. 4 is a perspective view illustrating a general outline of the rod lens array.
Figure 5:
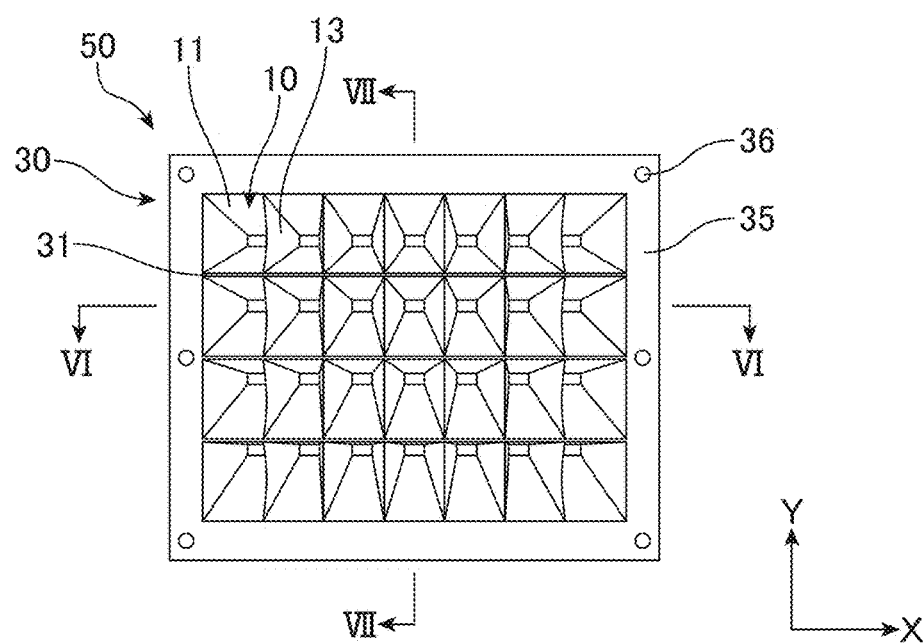
FIG. 5 is a diagram illustrating the rod lens array from a back side (incidence side).
Figure 6:
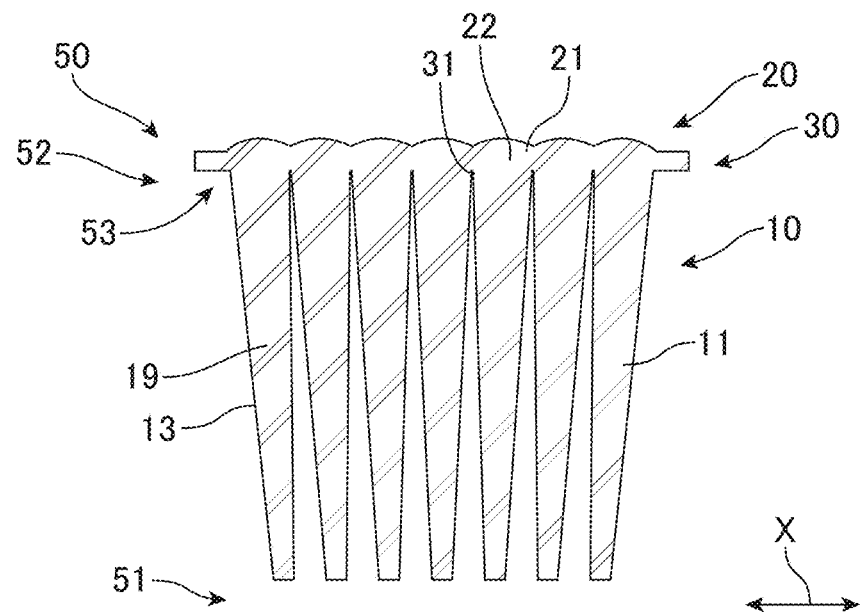
FIG. 6 is a sectional view of the rod lens array in a row direction X (taken along line VI-VI of FIG. 5).
Figure 7:
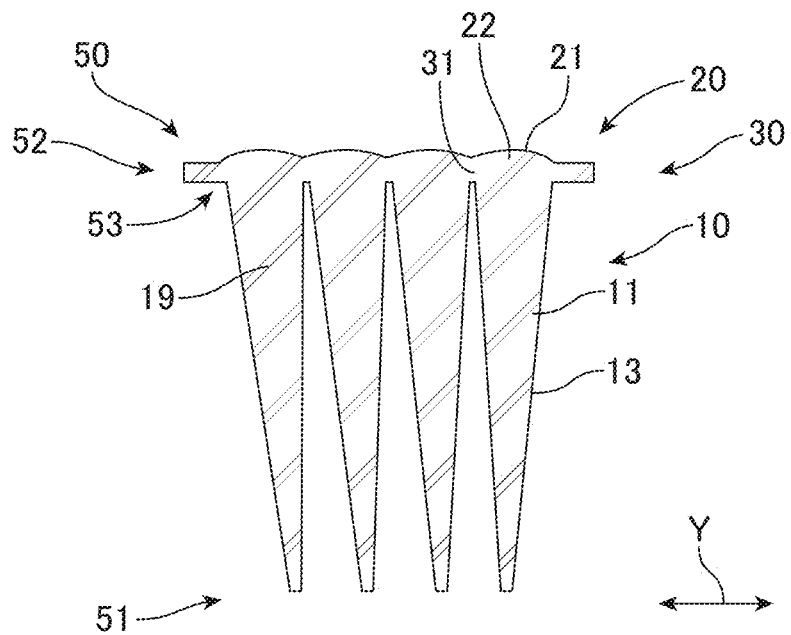
FIG. 7 is a sectional view of the rod lens array in a column direction Y (taken along line VII-VII of FIG. 5).

FIGS. 4 to 7 illustrate the rod lens array 50 in an isolated form. FIG. 4 is a perspective view of the rod lens array 50 viewed from the front side (emission side) 52, FIG. 5 is a view of the rod lens array 50 viewed from the back side (input side) 51, FIG. 6 is a sectional view in the row direction of the rod lens array (direction along the X axis) (taken along line VI-VI of FIG. 5), and FIG. 7 is a sectional view in the column direction of the rod lens array (direction along the Y axis) (taken along line VII-VII of FIG. 5).

The rod lens array 50 of this example is a 4×7 rod lens array in which four rod lens elements 11 are two-dimensionally disposed in the column direction Y and seven rod lens elements 11 are two-dimensionally disposed in the row direction X. The rod lens array is a compact optical element in which the length in the column direction is, for example, 44 mm, the length in the row direction is, for example, 70 mm, and the total length (length between the lead end of the lens array 22 and the input end of the rod lens element) is, for example, about 41.5 mm.

The rod lens array 50 includes the rod lens portion 10 in which rod lens elements 11 are two-dimensionally disposed; the emission portion 20 in which lens arrays 22 as curved elements 21 are two-dimensionally disposed on the emission side 52; and the connection portion 30 including the connection element 31 configured to integrally connect a plurality of two-dimensionally disposed rod lens elements 11 and a plurality of two-dimensionally disposed curved elements 21. The rod lens portion 10, emission portion 20 and connection portion 30 are integrally formed from the same transparent optical material (first light guide member). Therefore, an optical component (optical element) can be integrally formed and supplied in which a plurality of tapered rod lens elements 11 is integrated with lens arrays 22 by the connection element 31 at an expanded portion on the emission side 52.

In the rod lens array 50, the rod lens elements 11 are supported by the connection portion 30 with an air gap provided between the rod lens elements 11 on the input side 51 from the connection element 31. Therefore, in each rod lens element 11, a lateral surface 13 serves as a total reflection surface, so that light incident from the input side 51 can be efficiently transmitted to the emission side 52. Even when the rod lens element does not have a tapered shape but a rod shape, a plurality of rod lens elements may be supported by the connection element 31 with a minimum air gap provided between the rod lens elements.

Further, in the connection portion 30, a flange portion 35 extending in a plate form or a planar form on the periphery of the rod lens portion 10 and the emission portion 20 may be provided on the connection element 31 as an extension. Using the connection portion 30, a plurality of rod lens elements 11 arranged in an array form can be integrally and easily mounted in the lighting optical system 60, the image output system 65 or the projection device 1a, the direct-view-type device 1b, the HUD 2 and the like. The flange portion 35 may be provided with a hole 36 for mounting in advance.

Figure 8:
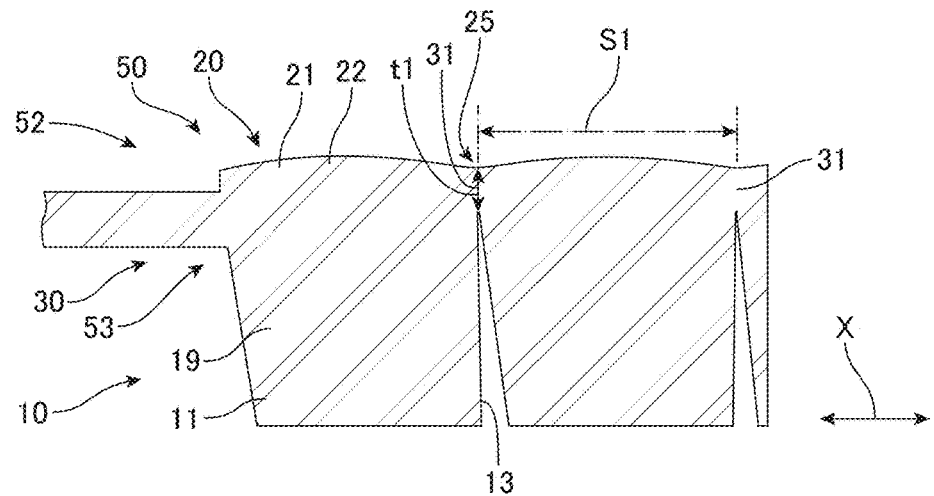
FIG. 8 is an enlarged view of the rod lens array on an emission side in the row direction X.
Figure 9:
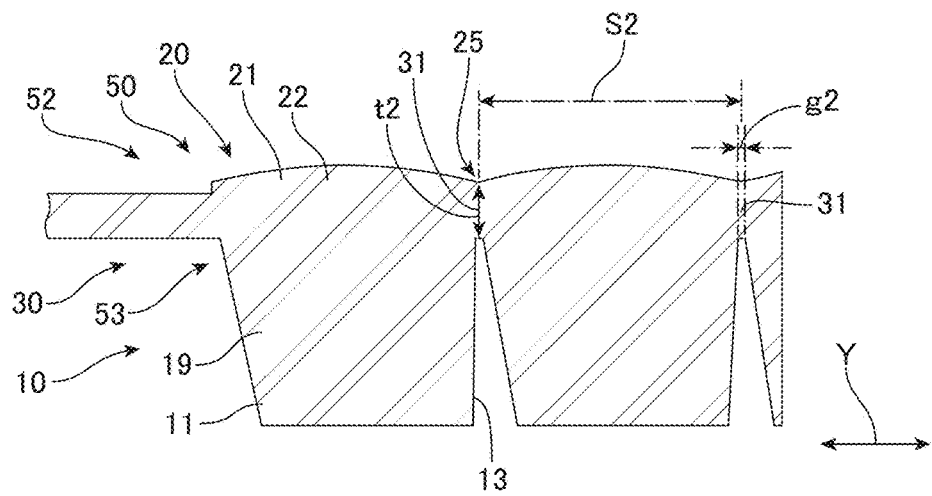
FIG. 9 is an enlarged view of the rod lens array on the emission side in the column direction Y.

FIG. 8 illustrates in an enlarged form a structure of the rod lens array 50 on an emission side 52 in the row direction X. FIG. 9 illustrates in an enlarged form a structure of the rod lens array 50 on the emission side 52 in the column direction Y. As shown in FIGS. 8 and 9, a thickness t1 of the connection element 31 in the row direction (first arrangement direction) X is different from a thickness t2 of the connection element 31 in the column direction (second arrangement direction) Y. The thickness t1 of the connection element 31 in the row direction X represents a residual wall thickness of the connection element 31, specifically a minimum thickness of the connection (boundary) between a plurality of rod lens elements 11 arranged in the row direction X. The thickness t2 of the connection element 31 in the column direction Y represents a residual wall thickness of the connection element 31, specifically a minimum thickness of the connection (boundary) between a plurality of rod lens elements 11 arranged in the column direction Y.

The present inventors have found that the thickness t1 of the connection element 31 in the row direction X and the thickness t2 of the connection element 31 in the column direction Y have an effect on a dark line appearing in the row direction X or the column direction Y. Reduction of the thickness t1 and the thickness t2 of the connection element 31 is effective for eliminating the dark line. On the other hand, when the thickness of the connection element 31 is reduced, strength becomes insufficient for connecting a plurality of rod lens elements 11, so that it is difficult to handle the rod lens array 50 as an integral component. The present inventors have further found that for the rod lens array 50, a virtual image in the row direction X is observed by both eyes in the HUD 2 including the rod lens array 50, and therefore a parallax is easily generated, so that a gap between light beams is easily recognized as a dark line. Thus, the row direction X is set to a first arrangement direction, and the thickness t1 in this direction is made smaller than the thickness t2 in the column direction Y as a second arrangement direction. Therefore, depending on an application or a device in which the rod lens array 50 is applied, the column direction Y may be the first arrangement direction in which the thickness t1 is set, with the row direction X being the second arrangement direction in which the thickness t2 is set.

It is desirable that the thickness t1 of the connection element in the first arrangement direction (row direction X in this examples) and the thickness t2 of the connection element in the second arrangement direction (column direction Y in this examples) satisfy the following condition (1) for reducing generation of a dark line and maintaining the strength of the rod lens array 50 as an optical component.

$$t1 < t2 \quad (1)$$

The thickness t1 in the first arrangement direction and the length S1 of the rod lens element 11 on the emission side 52 in the first arrangement direction may satisfy the following condition (2).

$$0.01 \leq t1/S1 \leq 0.2 \quad (2)$$

When t1/S1 is below the lower limit of the condition (2), it is difficult to maintain strength as the connection element 31. On the other hand, when t1/S1 is above the upper limit, the inhibitory effect on generation of a dark line is reduced.

The thickness t2 in the second arrangement direction and the length S2 of the rod lens element 11 on the emission side 52 in the second arrangement direction may satisfy the following condition (3).

$$0.1 \leq t2/S2 \leq 0.5 \quad (3)$$

When t2/S2 is below the lower limit of the condition (3), the strength of the rod lens array 50 is reduced, so that it is difficult to handle the rod lens array integrally as an optical component. When t2/S2 is above the upper limit, light is leaked to the adjacent rod lens element 11, and thus abnormal light is easily generated, so that a bright line is easily generated.

The distance g2 between rod lens elements 11 adjacent in the second arrangement direction (direction Y in this example) in the connection element 31 and the length S2 of the rod lens element 11 on the emission side 52 in the second arrangement direction may satisfy the following condition (4).

$$0.01 \leq g2/S2 \leq 0.2 \quad (4)$$

When g2/S2 is below the lower limit of the condition (4), the distance between the end of the rod lens element 11 and the lens array 22 as the curved element 21 on the emission side 52 increases, and thus the amount of abnormal light leaked from the end of the rod lens element 11 increases, so that a bright line is easily generated. When g2/S2 is above the upper limit, the size of a gap between light beams increases, so that a dark line is easily observed even in the second arrangement direction.

Figure 10:
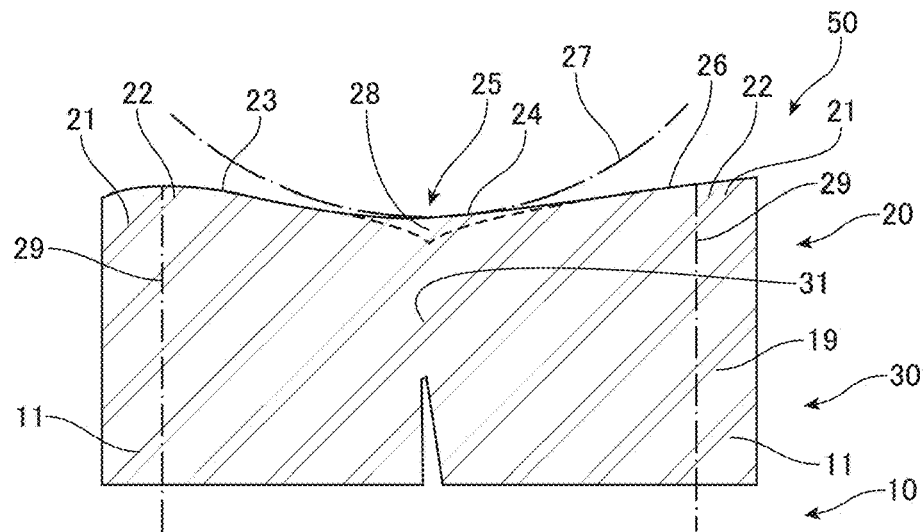
FIG. 10 is an enlarged view of a boundary portion of the rod lens array on the emission side.

FIG. 10 illustrates in an enlarged form a cross-section of a portion including a boundary 25 between a plurality of curved elements 21 of the emission portion 20 of the rod lens array 50. Each of a plurality of curved elements 21 includes, at the boundary 25 with the adjacent curved element 21, a portion 28 having a curvature 27 different from curvature 26 at an optical axis 29 or the center of the curved element 21. Further specifically, a plurality of curved elements 21 includes a surface 23 convex to the emission side 52 at the center, and a surface 24 concave to the emission side 52 at the boundary 25. Each of a plurality of curved elements 21 may include, at a boundary with the adjacent curved element, a portion having different curvatures in the first arrangement direction (e.g., row direction X) and the second arrangement direction (e.g., column direction Y).

There are cases where the boundary 25 between convex curved elements 21, emitted light from adjacent curved elements 21 crosses each other, so that light with a high intensity is observed, resulting in generation of a bright line. For reducing the bright line, it is effective to change the curvature of the curved element 21 in the vicinity of the boundary 25 to provide a flexion point, so that concentration of emitted light is reduced. Further, by changing the curved surface in the vicinity of the boundary 25 from a convex surface to a concave surface to diffuse concentrated emitted light, generation of a bright line at the boundary 25 between curved elements 21 can be further reduced.

The curvature Rx of a surface 24 in the row direction X and the curvature Ry in the column direction Y in the curvature 27 of the surface which is provided at the boundary 25 and which is concave to the emission side 52 may satisfy the following conditions (5) and (6) with respect to the length S1 and the length S2 of the rod lens element 11 on the emission side 52 in the row direction X and the column direction Y, respectively.

$$0.0003 < Rx/S1 < 0.03 \quad (5)$$

$$0.0003 < Ry/S2 < 0.03 \quad (6)$$

The curvature Rx in the row direction X and the curvature Ry in the column direction Y may be changed from one column to another or from one row to another depending on the luminance of the bright line or the like.

FIG. 11 illustrates results of simulating observed generation of a bright line and a dark line. FIGS. 11A and 11B illustrate results of observing an intermediate image projected using the rod lens array 50 with no measures taken to reduce the bright line and the dark line, where FIG. 11A illustrates the intermediate image viewed from the front side, and FIG. 11B illustrates a result of observing the intermediate image obliquely. The rod lens array 50 with no measures taken to reduce the bright line and the dark line is a rod lens array in which the thickness t1 and the thickness t2 of the connection element 31 in the row direction X and the column direction Y are equal to each other, and further specifically, in examination of the intermediate image, the thickness t1 of the connection element 31 in the row direction X, the length S1 of the rod lens element 11 on the emission side 52 in the row direction X, and the thickness t2 of the connection element 31 in the column direction Y, the length S2 of the rod lens element 11 on the emission side 52 in the column direction Y, and the distance g2 between rod lens elements 11 adjacent in the column direction Y are set as follow.
Thickness t1: 2.35 mm
Length S1: 10 mm
Thickness t2: 2.35 mm
Length S2: 11 mm
Distance g2: 0.27 mm
In FIGS. 11A and 11B, a dark line 91 intermittently appearing in the row direction X is observed along the column direction Y, and a bright line 92 intermittently appearing in the column direction Y is observed along the row direction X.

Figure 11A:
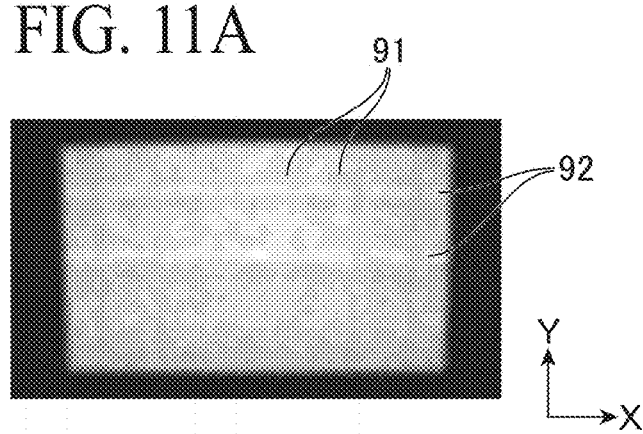
FIG. 11A is a diagram illustrating results of simulating observed generation of a bright line and a dark line, also illustrating results of observing an intermediate image projected viewed from the front side using a rod lens array with no measures taken to reduce the bright line and the dark line.
Figure 11B:
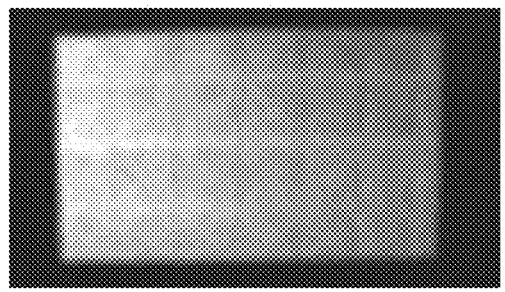
FIG. 11B is a diagram illustrating results of simulating observed generation of a bright line and a dark line, also illustrating results of observing an intermediate image projected observed obliquely using a rod lens array with no measures taken to reduce the bright line and the dark line.
Figure 11C:
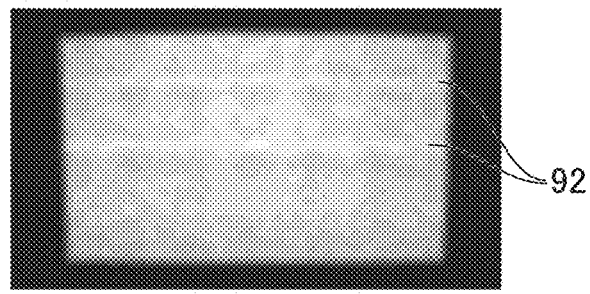
FIG. 11C is a diagram illustrating results of simulating observed generation of a bright line and a dark line, also illustrating results of observing an intermediate image projected viewed from the front side using a rod lens array with measures taken to reduce the dark line.
Figure 11D:
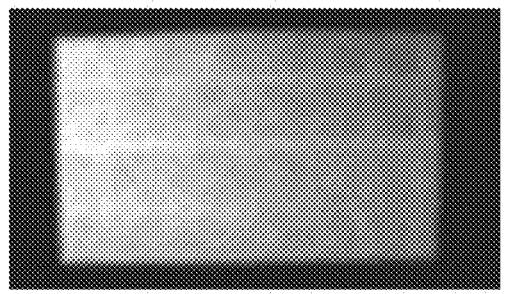
FIG. 11D is a diagram illustrating results of simulating observed generation of a bright line and a dark line, also illustrating results of observing an intermediate image projected observed obliquely using a rod lens array with measures taken to reduce the dark line.

FIGS. 11C and 11D illustrate results of observing an intermediate image projected using the rod lens array 50 with measures taken to reduce the dark line, where FIG. 11C illustrates the intermediate image viewed from the front side, and FIG. 11D illustrates a result of observing the intermediate image obliquely. The rod lens array 50 with measures taken to reduce the dark line is a rod lens array in which the thickness t1 of the connection element 31 in the row direction X, the length S1 of the rod lens element 11 on the emission side 52 in the row direction X, and the thickness t2 of the connection element 31 in the column direction Y, the length S2 of the rod lens element 11 on the emission side 52 in the column direction Y, and the distance g2 between rod lens elements 11 adjacent in the column direction Y are controlled so as to satisfy the conditions (1) to (4). Specifically, in examination of the intermediate image, these values are set as follows.
Thickness t1: 0.79 mm
Length S1: 10 mm
Thickness t2: 2.35 mm
Length S2: 11 mm
Distance g2: 0.27 mm
As is apparent from FIGS. 11C and 11D, the dark line along the column direction Y is hardly observed.

Figure 12A:
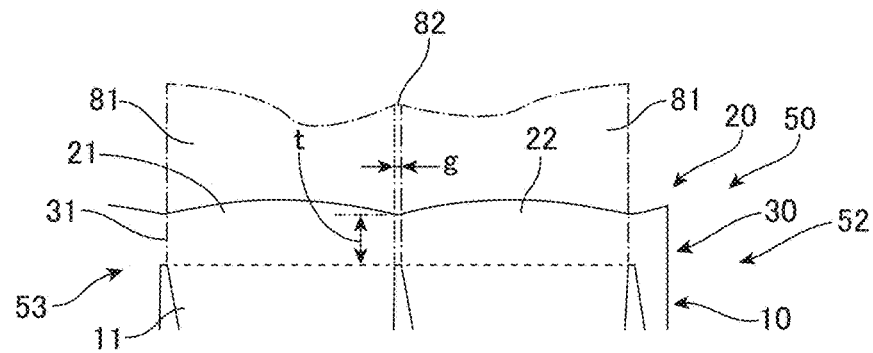
FIG. 12A is a diagram illustrating states of generation of the dark line before the measures are taken.
Figure 12B:
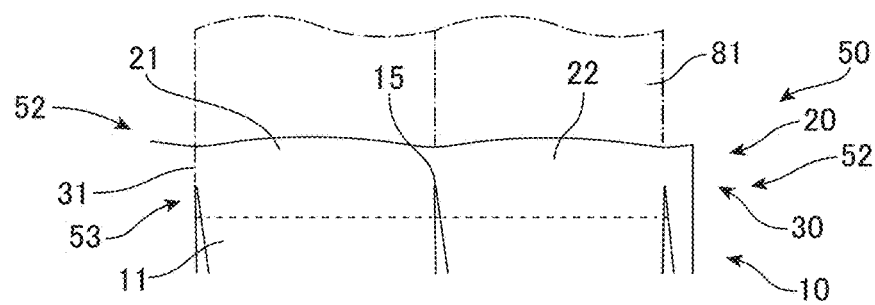
FIG. 12B is a diagram illustrating states of generation of the dark line after the measures are taken.

FIG. 12 is a diagram illustrating states of generation of the dark line, where FIG. 12A illustrates a state before the measures are taken, and FIG. 12B illustrates a state after the measures are taken. FIG. 12 schematically illustrates a light beam outputted from the rod lens array 50. As illustrated in FIG. 12A, the gap g is generated between adjacent rod lens elements 11 when the thickness t of the connection element 31 is large. Therefore, it is considered that a gap 82 is generated between light beams 81 outputted from the rod lens array 50, resulting in observation of a dark line. In particular, in a direction of viewing a virtual image by both eyes, a parallax is easily generated, so that the gap 82 between light beams is easily recognized, resulting in observation of a dark line.

As illustrated in FIG. 12B, when the thickness t of the connection element 31 is small, the connection element 31 can be thinned to an end portion 15 of the tapered rod lens element 11 or its vicinity, so that generation of the gap g between rod lens elements 11 can be reduced. Therefore, it is considered that a gap is hardly generated between light beams 81 outputted from the rod lens array 50, so that a dark line is hardly observed. Therefore, in the rod lens array 50, a region of the curved element 21 functioning as the lens array 22 may be provided at the end portion 15 of the rod lens element 11 or in its vicinity so that a distance which acts as another optical element is not provided at the connection portion 53 in the rod lens element 11 and the lens array 22 as the curved element 21, and the connection element 31 may connect a part of regions functioning as the rod lens element 11 and/or the lens array 22.

Figure 13:
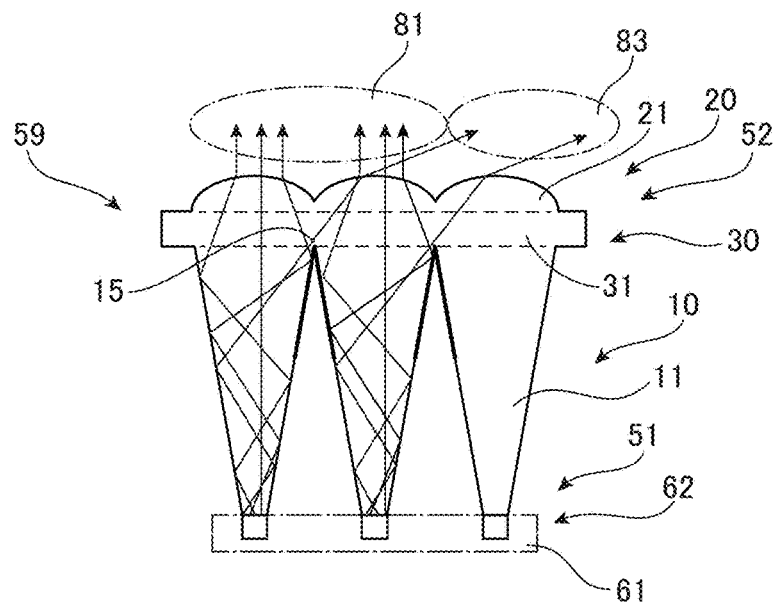
FIG. 13 is a diagram illustrating a general outline of different rod lens arrays.

FIG. 13 illustrates a different example of the rod lens array. The rod lens array 59 includes the rod lens portion 10 including a plurality of rod lens elements 11 which is in contact with a LED 61 forming the light source array 62 and which has a tapered shape with a size larger on the emission side (output side) 52 than on the input side 51; the emission portion 20 including a plurality of lens arrays 22 disposed, respectively, on a plurality of rod lens elements 11 on the output side 52 and serving as curved elements 21; and the connection portion 30 including the connection element 31 two-dimensionally extending so as to connect the rod lens element 11 to the curved element 21. In the rod lens array 59, the connection element 31 is provided between the end portion 15 of the rod lens element 11 and the curved element 21 so as to reliably obtain an optical distance. Therefore, a gap is not formed on the emission side 52 of adjacent rod lens elements 11, and a gap is hardly generated between outputted light beams 81. Therefore, generation of a dark line can be reduced. On the other hand, since the connection element 31 functions as a light guide portion, a light beam 83 outputted through the curved element 21 which is adjacent and does not correspond to the rod lens element 11 can be generated from the emission side 52 of the rod lens element 11. The light beam 83 can be observed as a bright line when the intermediate image is viewed obliquely. For reducing a bright line which appears only in observation with a view angle, it is useful to make the connection element 31 less functional as a light guide portion, and it is effective to employ a structure in which the end portion 15 of the rod lens element 11 is connected to the curved element 21 by reducing the thickness t of the connection element 31 as shown in FIG. 12B.

Figure 11E:
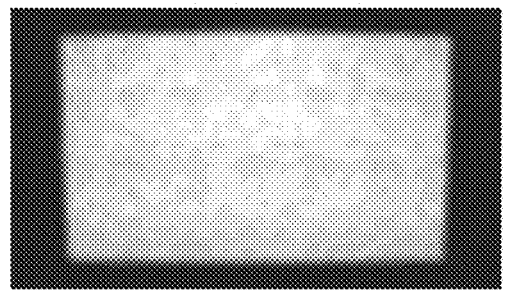
FIG. 11E is a diagram illustrating results of simulating observed generation of a bright line and a dark line, also illustrating results of observing an intermediate image projected viewed from the front side using a rod lens array with measures taken to reduce the dark line and the bright line.
Figure 11F:
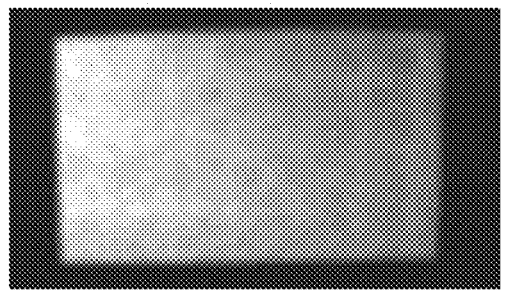
FIG. 11F is a diagram illustrating results of simulating observed generation of a bright line and a dark line, also illustrating results of observing an intermediate image projected observed obliquely using a rod lens array with measures taken to reduce the dark line and the bright line.

Referring to FIG. 11 again, FIGS. 11E and 11F illustrate results of observing an intermediate image projected using the rod lens array 50 with measures taken to reduce not only the dark line but also the bright line, where FIG. 11E illustrates the intermediate image viewed from the front side, and FIG. 11F illustrates a result of observing the intermediate image obliquely. The rod lens array 50 with measures taken to reduce the dark line is a rod lens array in which concentration of emitted light at the boundary 25 is reduced by changing curvatures Rx and Ry in the vicinity of the boundary 25 between curved elements 21 so as to satisfy conditions (5) and (6) in addition to the conditions (1) to (4). Specifically, in the column direction Y, the curvature Rx1 is set to 1%, the curvature Rx2 is set to 1.5%, and the curvature Rx3 is set to 0.05% in the ascending order at boundaries 25 between curved elements 21 corresponding to rod lens elements 11 disposed in four stages. In FIGS. 11C and 11D, a bright line 92 is present along the row direction X, and in FIGS. 11E and 11F, this bright line is reduced.

Figure 14A:
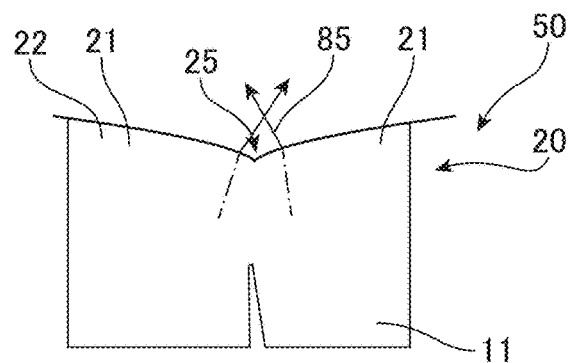
FIG. 14A is a diagram illustrating states of generation of the bright line before the measures are taken.
Figure 14B:
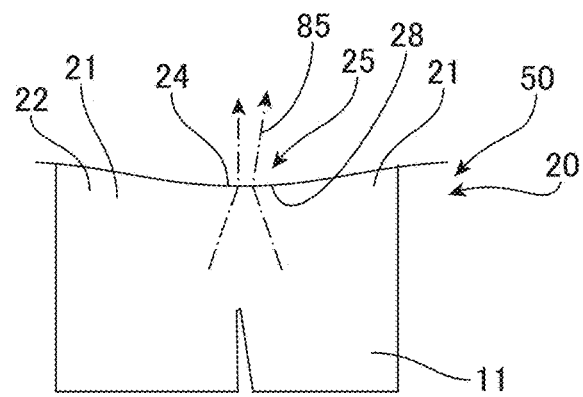
FIG. 14B is a diagram illustrating states of generation of the bright line after the measures are taken.

FIG. 14 is a diagram illustrating states of generation of the bright line, where FIG. 14A illustrates a state before the measures are taken, and FIG. 14B illustrates a state after the measures are taken. FIG. 14 schematically illustrates a light beam outputted from the rod lens array 50. FIG. 14A schematically illustrates a light beam 85 outputted from the rod lens array 50 in which convex curved elements 21 are directly adjacent on the emission side 52. FIG. 14B schematically illustrates a light beam 86 outputted when the boundary 25 between curved elements 21 is replaced by the surface 24 concave to the emission side 52. As shown in FIG. 14A, at the boundary 25 where convex surfaces are in contact with each other, light beams 86 are cross each other, so that a bright line is easily observed. On the other hand, as shown in FIG. 14B, by providing the boundary 25 with a portion 28 having a different curvature radius to dispose the surface 24 concave to the emission side 52, light beams 85 outputted from the boundary 25 between rod lens elements 11 can be parallelized, so that it is possible to provide the rod lens array 50 with measures taken to reduce generation of the bright line.

Figure 15:
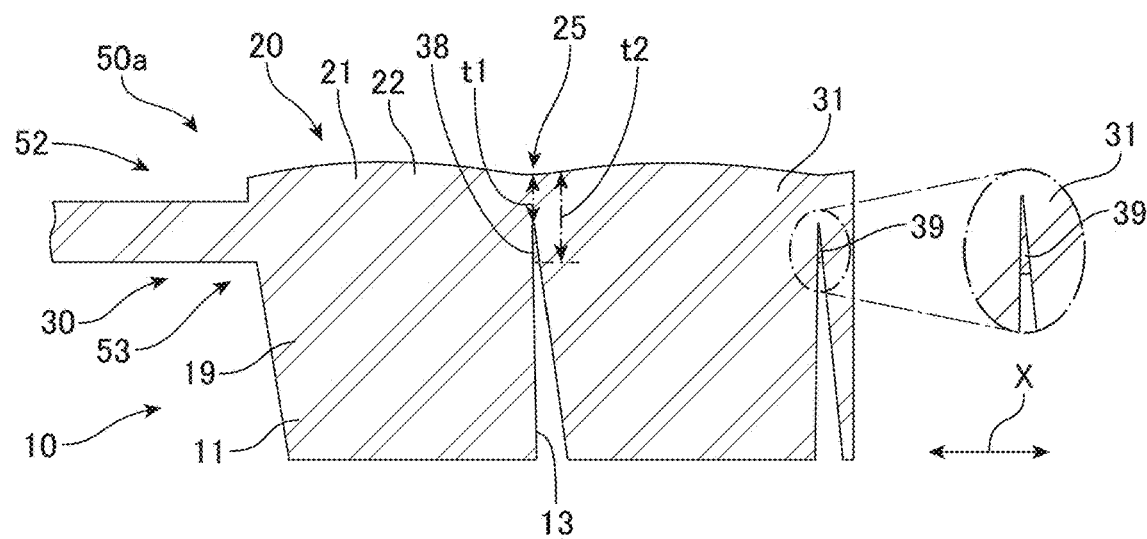
FIG. 15 is a diagram illustrating a general outline of different rod lens arrays.

FIG. 15 illustrates a different example of the rod lens array. The rod lens array 50a includes the rod lens portion 10 formed from the first light guide member 19, the emission portion 20 and the connection portion 30, and the thickness t1 of the connection element 31 in the row direction X, the length S1 of the rod lens element 11 on the emission side 52 in the row direction X, and the thickness t2 of the connection element 31 in the column direction Y, the length S2 of the rod lens element 11 on the emission side 52 in the column direction Y, and the distance g2 between rod lens elements 11 adjacent in the column direction Y are set so as to satisfy the material conditions (1) to (4). The rod lens array 50a further includes a portion (supplement element) 38 for supplementing the thickness t1 of the connection element 31 in the row direction X for the thickness t2 of the connection element in the column direction Y with a second member 39 different from the first light guide member 19. The second member 39 may be a member which reflects light, or the second member 39 may be a member which has a refractive index sufficiently low with respect to the refractive index of the first light guide member 19, so that light is totally reflected at a boundary surface with the first light guide member 19. The thickness t1 of a light-guiding portion of the connection element 31 in the row direction X can be decreased to reduce generation of a dark line, and the same thickness as in the column direction Y can be reliably obtained for the connection element 31 including the portion 38 formed from the second member 39, so that it is possible to provide the rod lens array 50a having higher strength. The rod lens array 50a can be manufactured by a method such as two-color formation, and the thickness of the connection element 31 in the row direction X including the portion 38 formed from the second member 39 may be larger than the thickness of the connection element 31 in the column direction Y.

The invention claimed is:

1. A rod lens array comprising:
a rod lens portion in which a plurality of rod lens elements including a first light guide member are two-dimensionally arranged;
an emission portion in which a plurality of curved elements including the first light guide member are two-dimensionally arranged so as to correspond, respectively, to the plurality of rod lens elements on an emission side; and
a connection portion in which a connection element including the first light guide member two-dimensionally extends so as to integrally connect the plurality of curved elements to the plurality of rod lens elements, wherein
the connection element has different thicknesses in a first arrangement direction and a second arrangement direction,
the first and second arrangement directions are perpendicular and
a thickness t1 of the connection element in the first arrangement direction and a length S1 of each of the plurality of rod lens elements on the emission side in the first arrangement direction satisfy the following condition: $0.01 \leq t1/S1 \leq 0.2$.

2. The rod lens array according to claim 1, wherein the connection element has a thickness smaller in the first arrangement direction than in the second arrangement direction.

3. The rod lens array according to claim 1, wherein a distance g2 between the rod lens elements adjacent in the second arrangement direction in the connection element and a length S2 of the rod lens element on the emission side in the second arrangement direction satisfy the following condition:

$$0.01 \leq g2/S2 \leq 0.2.$$

4. The rod lens array according to claim 1, wherein a thickness t2 of the connection element in the second arrangement direction and the length S2 of the rod lens element on the emission side in the second arrangement direction satisfy the following condition:

$$0.1 \leq t2/S2 \leq 0.5.$$

5. The rod lens array according to claim 1, wherein the connection portion includes a supplement element that supplements a difference between a thickness in the first arrangement direction and a thickness in the second arrangement direction with a second member.

6. The rod lens array according to claim 1, wherein each of the plurality of curved elements includes at a boundary with an adjacent curved element a portion having a different curvature.

7. The rod lens array according to claim 1, wherein each of the plurality of curved elements includes at a boundary with an adjacent curved element a portion having different curvatures in the first arrangement direction and the second arrangement direction.

8. The rod lens array according to claim 1, wherein each of a plurality of rod lens elements has a tapered shape with a size larger on the emission side than on an incidence side.

9. The rod lens array according to claim 8, wherein the connection element is provided so as to connect a part of the plurality of rod lens elements.

10. The rod lens array according to claim 8, wherein the rod lens portion has a tapered shape with a size larger on the emission side than on the incidence side.

11. A lighting optical system comprising:
the rod lens array according to claim 1; and
a light source array in which a plurality of light source elements is two-dimensionally arranged so as to correspond, respectively, to the plurality of rod lens elements on the incidence side.

12. A device comprising:
the lighting optical system described in claim 11; and
a projection optical system configured to project a projection light that is a light outputted from the lighting optical system and modulated by an image device.

13. A lighting optical system comprising:
the rod lens array according to claim 1; and
a light source array in which m×n light source elements is two-dimensionally arranged so as to correspond, respectively, to the m×n rod lens elements on the incidence side.

14. A device comprising:
the lighting optical system according to claim 13; and
a projection optical system configured to project projection light which is light outputted from the lighting optical system and modulated by an image device.

15. A rod lens array comprising:
a rod lens portion in which m×n rod lens elements including a first light guide member are two-dimensionally arranged with the m rod lens elements in a first direction and the n rod lens elements in a second direction that is perpendicular to the first direction;
an emission portion on an emission side in which m×n curved elements including the first light guide member are two-dimensionally arranged with the m curved elements in the first direction and the n curved elements in the second direction so as to correspond, respectively, to the m×n rod lens elements; and
a connection portion in which a connection element including the first light guide member two-dimensionally extends so as to integrally connect the m×n curved elements to the m×n rod lens elements,
wherein the connection element has different thicknesses in the first direction and the second direction.

* * * * *